United States Patent
Laddu et al.

(10) Patent No.: US 11,632,750 B2
(45) Date of Patent: Apr. 18, 2023

(54) INTER-CELL MULTI-TRP OPERATION FOR WIRELESS NETWORKS

(71) Applicant: Nokia Technologies Oy, Espoo (FI)

(72) Inventors: Keeth Saliya Jayasinghe Laddu, Espoo (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 84 days.

(21) Appl. No.: 17/221,323

(22) Filed: Apr. 2, 2021

(65) Prior Publication Data

US 2022/0322310 A1 Oct. 6, 2022

(51) Int. Cl.
*H04W 72/04* (2009.01)
*H04L 1/1812* (2023.01)
*H04L 5/00* (2006.01)
*H04W 92/10* (2009.01)

(52) U.S. Cl.
CPC ......... *H04W 72/042* (2013.01); *H04L 1/1812* (2013.01); *H04L 5/0035* (2013.01); *H04L 5/0037* (2013.01); *H04W 92/10* (2013.01)

(58) Field of Classification Search
CPC .. H04W 72/042; H04W 92/10; H04L 1/1812; H04L 5/0037; H04L 5/0035
See application file for complete search history.

(56) References Cited

U.S. PATENT DOCUMENTS

2020/0052950 A1  2/2020  Manolakos et al.
2020/0351055 A1  11/2020  Manolakos et al.

FOREIGN PATENT DOCUMENTS

CN  111867109 A  10/2020
CN  112119597 A  12/2020
WO  2021/034672 A1  2/2021

OTHER PUBLICATIONS

Nokia et al.: "Enhancements t enable inter-cell multi-TRP operations", 3GPP Draft; R1-2101007, 3rd Generation Partnership Project (3GPP), Mobile Competencnce Centre; 650, Route Des Lucioles; F-06921 Sophia-Antipolis Cedex; France, vol. RAN WG1, 2021-01-2018 (Year: 2018).*

(Continued)

*Primary Examiner* — Brenda H Pham
(74) *Attorney, Agent, or Firm* — Nokia Technologies Oy

(57) ABSTRACT

An method includes determining to perform inter-cell multi-downlink control information (multi-DCI) based multi-transmission reception point (multi-TRP) operation for a user device based on the following: receiving, by the user device from a network node, transmission configuration index (TCI) states for a plurality of control resource sets (CORESETS), wherein the TCI states for the plurality of CORESETs are associated with a plurality of cells having different physical cell identities (PCIs) or associated with a plurality of cell groups; and determining, by the user device, that at least one of the following conditions is present: 1) a multi-DCI based multi-TRP-related high layer parameter has been configured to the user device; 2) a default mode of multi-TRP operation has been configured to the user device; or 3) the user device has received control information indicating physical downlink shared channel (PDSCH) TCI state activations corresponding to two different CORESET-PoolIndex values; and, performing inter-cell multi-DCI based multi-TRP operation.

20 Claims, 6 Drawing Sheets

(56) References Cited

OTHER PUBLICATIONS

International Search Report and Written Opinion received for corresponding Patent Cooperation Treaty Application No. PCT/EP2022/057739, dated Aug. 1, 2022, 11 pages.

"Enhancements to enable inter-cell multi-TRP operations", 3GPP TSG RAN WG1 #104-e Meeting, R1-2101007, Agenda : 8.1.2.2, Nokia, Jan. 25-Feb. 5, 2021, 6 pages.

"3rd Generation Partnership Project; Technical Specification Group Radio Access Network; NR; User Equipment (UE) radio access capabilities (Release 16)", 3GPP TS 38.306, V16.4.0, Mar. 2021, pp. 1-151.

"New WID: Further Enhancements on MIMO for NR", 3GPP TSG RAN Meeting #86, RP-193133, Agenda : 9.1.1, Samsung, Dec. 9-12, 2019, 5 pages.

"3rd Generation Partnership Project;Technical Specification Group Radio Access Network; NR;Physical layer procedures for control (Release 16)", 3GPP TS 38.213, V16.4.0, Dec. 2020, pp. 1-181.

"3rd Generation Partnership Project;Technical Specification Group Radio Access Network; NR;Physical channels and modulation (Release 16)", 3GPP TS 38.211, V16.4.0, Dec. 2020, pp. 1-133.

"3rd Generation Partnership Project;Technical Specification Group Radio Access Network; NR;Physical layer procedures for data (Release 16)", 3GPP TS 38.214, V16.4.0, Dec. 2020, pp. 1-169.

"3rd Generation Partnership Project;Technical Specification Group Radio Access Network; NR;Radio Resource Control (RRC) protocol specification(Release 16)", 3GPP TS 38.331, V16.3.1, Jan. 2021, pp. 1-932.

"3rd Generation Partnership Project;Technical Specification Group Radio Access Network; NR;Medium Access Control (MAC) protocol specification(Release 16)", 3GPP TS 38.321, V16.3.0, Dec. 2020, pp. 1-156.

"Feature Lead Summary on Enhancements on Multi-TRP Inter-cell Operation", 3GPP TSG RAN WG1 #104-e, R1-200xxxx, Agenda : 8.1.2.2, moderator (vivo), Jan. 25-Feb. 5, 2021, 22 pages.

* cited by examiner

INTER-CELL MULTI-TRP OPERATION FOR WIRELESS NETWORKS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include determining, by a user device within a wireless network, to perform inter-cell multi-downlink control information (multi-DCI) based multi-transmission reception point (multi-TRP) operation for a user device based on the following: receiving, by the user device from a network node, transmission configuration index (TCI) states for a plurality of control resource sets (CORESETS), wherein the TCI states for the plurality of CORESETs are associated with a plurality of cells having different physical cell identities (PCIs) or associated with a plurality of cell groups, wherein the TCI states indicate Quasi Co-Location (QCL) characteristics to be used by the user device for receiving physical downlink control channels (PDCCHs) associated with the plurality of cells with different PCIs or associated with the plurality of cell groups, wherein the plurality of cells or the plurality of cell groups include at least a serving cell and at least one non-serving cell for the user device; and determining, by the user device, that at least one of the following conditions is present: 1) a multi-DCI based multi-TRP-related high layer parameter has been configured to the user device; 2) a default mode of multi-TRP operation has been configured to the user device; or 3) the user device has received control information indicating physical downlink shared channel (PDSCH) TCI state activations corresponding to two different CORESETPoolIndex values; and performing, by the user device, inter-cell multi-DCI based multi-TRP operation with cells from the plurality of the cells, or with cells from the plurality of cell groups, based on the determining to perform multi-DCI based inter-cell multi-TRP operation.

Additional example embodiments are provided corresponding to each of the methods, including at least the following for each of the methods: An apparatus that include means for performing each of the methods; An apparatus including at least one processor; and at least one memory including computer program code; the at least one memory and the computer program code configured to, with the at least one processor, cause the apparatus at least to perform the method; And, a non-transitory computer-readable storage medium comprising instructions stored thereon that, when executed by at least one processor, are configured to cause a computing system to perform a method The details of one or more examples of embodiments are set forth in the accompanying drawings and the description below. Other features will be apparent from the description and drawings, and from the claims.

DETAILED DESCRIPTION

Figure 1:
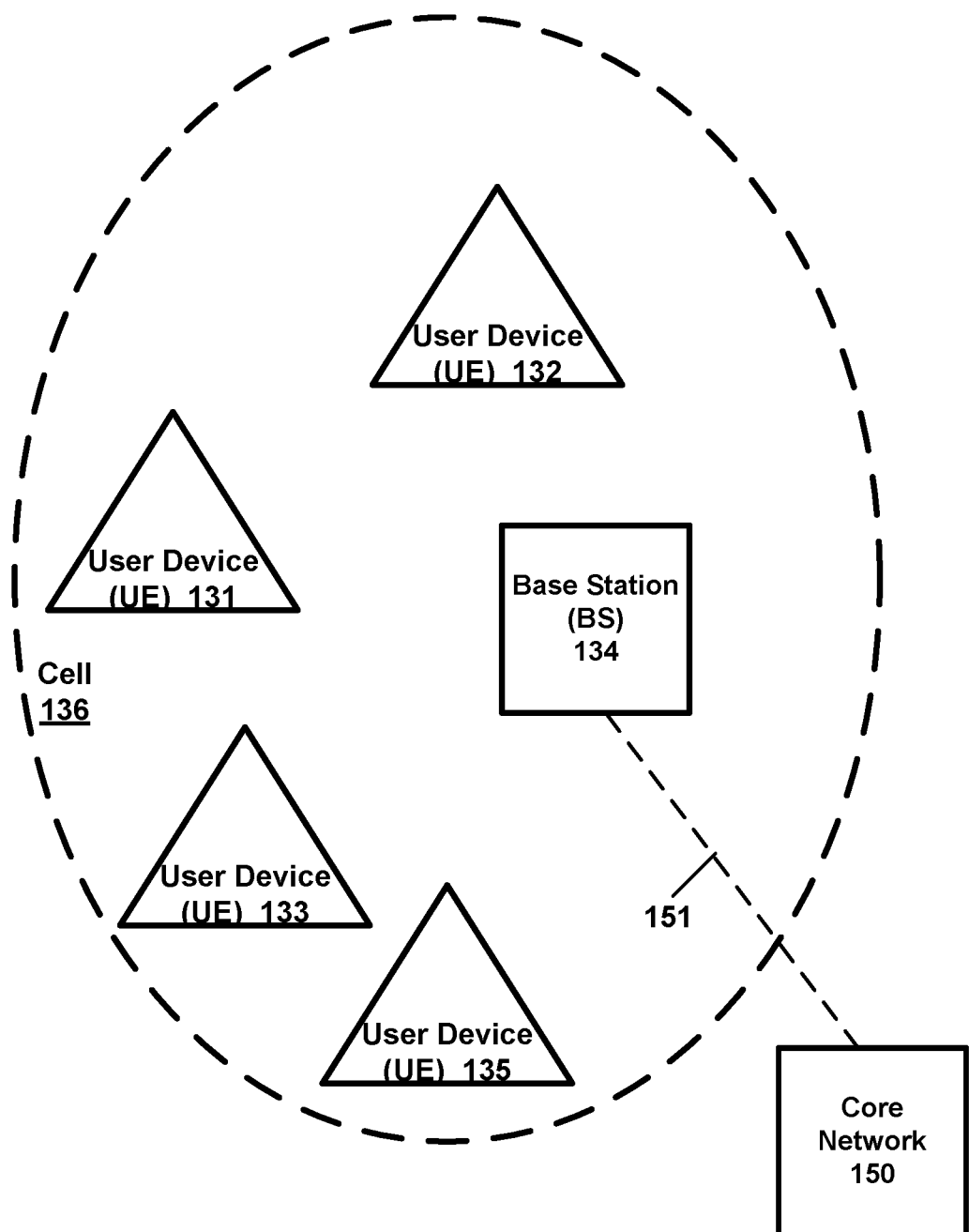
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), or a next generation Node B (gNB). The terms user device and user equipment (UE) may be used interchangeably. A BS may also be referred to as a RAN (radio access network) or NG-RAN (next generation radio access network) node. At least part of the functionalities of a BS (e.g., AP, gNB, eNB, RAN node) may also be carried out by one or more network nodes, servers or hosts, such as a centralized unit (CU) and a distributed unit (DU) in a split RAN architecture, which may be operably coupled to a remote transceiver, such as a remote radio head (RRH). BS 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

According to an illustrative example, a BS (e.g., AP, eNB, gNB, RAN node) may be part of a mobile telecommunication system. A RAN may include one or more RAN nodes (e.g., AP, BSs, eNBs, gNBs) that implement a radio access technology, e.g., to allow one or more UEs to have access to a network or core network. Thus, the RAN nodes reside between one or more user devices or UEs and a core network. According to an example embodiment, each RAN node may provide one or more wireless communication services for one or more UEs or user devices, e.g., to allow the UEs to have wireless access to a network, via the RAN node. Each RAN node may perform or provide wireless communication services, e.g., such as allowing UEs or user devices to establish a wireless connection to the RAN node, and sending data to and/or receiving data from one or more of the UEs. For example, after establishing a connection to a UE, a RAN node may forward data to the UE that is received from a network or the core network, and/or forward data received from the UE to the network or core network. RAN nodes may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, a wearable device, as examples, or any other wireless device. It should be appreciated that a user device may also be (or may include) a nearly exclusive uplink only device, of which an example is a camera or video camera loading images or video clips to a network.

Core network 150 may include a mobility management entity (MME) or an access and mobility management function (AMF), which may control access to the network, and handle or assist with mobility/handover of user devices between BSs, one or more gateways that may forward data between the BSs and a packet data network or the Internet, and other control nodes, functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G/New Radio (NR), or any other wireless network or wireless technology operating on cmWave and/or mmWave bands, and to a wide variety of communication services, such as IoT, MTC, eMTC, eMBB, URLLC, etc. These example networks, technologies or data service types are provided only as illustrative examples.

A UE may be configured by a gNB (or other network node) to perform different measurements and measurement reporting to the network (or gNB(s)). A configuration of a UE to perform reference signal (or beam) measurement (e.g., such as CSI-RS measurement for different beams) and reporting may be performed by a gNB sending a report configuration (e.g., such as a CSI-Report-Config) to the UE. A report configuration, for example, may indicate downlink resource(s) on which measurements should be performed (e.g., CSI-RS reference signals/SSBs, or beams), specific quantities or parameters to be measured, and how the reporting is to be performed, such as when the reporting is done, etc.

A UE may measure a signal parameter(s) (e.g., such as a reference signal received power (RSRP)) of each of a plurality of downlink reference signals (e.g., such as synchronization signal block/SSB signals, or channel state information (CSI)-reference signals (CSI-RS)) received by the UE from the gNB/network node (or BS), where each reference signal may be transmitted by the gNB via a different gNB transmit beam (or via a different downlink DL reference signal). The UE may determine the strongest beams or reference signals (e.g., having a highest RSRP), and then may send a measurement report to the gNB that may identify the strongest N DL reference signals (or beams), and the RSRP (or other measured signal parameter) of these N beams, for example. The gNB may use this measurement report to determine what beam to use to communicate with the UE, for example.

According to an example embodiment, a PDCCH (physical downlink control channel) may be transmitted using 1, 2, 4, 8 or 16 contiguous control-channel elements (CCEs), where the number of CCEs may be referred to as the aggregation level (or CCE aggregation level). According to an example embodiment, a CCE is a building block of a PDCCH, where a CCE may be a smallest set of resources that can be used for a PDCCH. For example, a CCE may be a unit upon which search spaces for blind decoding may be defined. Thus, each PDCCH may include one or more CCEs, depending on the aggregation level. According to an example embodiment, a CCE may include 6 resource element groups (REGs), each of which may include one resource block in an OFDM symbol.

A search space may include a set of candidate PDCCHs (candidate downlink control channels) formed by CCEs at given aggregation level(s), which the UE is supposed to attempt to decode. A UE may have multiple search spaces for different purposes (such as different common search spaces, and user-specific search spaces). A search space may include one or more control resource sets (CORESETs). A CORESET may be (or may include) the time-frequency resources upon which a PDCCH(s) is transmitted. There can be multiple search spaces using a same control resource set (CORESET), and there can be multiple CORESETs configured for a UE. Also, a control resource set (CORESET) may be (or may include) time-frequency resources in which the UE tries to decode candidate PDCCHs using one or more search spaces.

At a configured PDCCH monitoring occasion (e.g., time(s) or locations within a slot where a PDCCH may be transmitted) for a search space, UEs will attempt to decode the candidate PDCCHs for that search space, for one or more DCI formats. For example, up-to five (or other number) of aggregation levels (e.g., corresponding to 1, 2, 4, 8 or 16 CCEs) with a given number of PDCCH candidates for each aggregation level can be configured for a certain search space. There may be multiple (e.g., 4, or other number) different DCI formats that the UE may perform decoding for. Thus, there may be different DCI formats used for transmission of a DCI on a PDCCH, and the DCI format is typically unknown in advance by the UE, and thus, the UE may need to blindly (e.g., DCI format a priori unknown to UE) detect the DCI format.

Thus, a search space configuration may be provided to or communicated to a UE, and may include, for example, information identifying one or more of: a control resource set (CORESET) indicating the time-frequency resources upon which a PDCCH(s) is transmitted; demodulation reference (DMRS) signals, which may be used by the UE for demodulation of data or control signals (e.g., DCI); an indication of PDCCH monitoring occasions, which may include times or locations within a slot(s) where a PDCCH(s) may be transmitted; DCI format(s) to be monitored; and/or, a number of PDCCHs (or PDCCH candidates) monitored for each aggregation level.

From the perspective of a UE, each PDCCH may be considered a PDCCH candidate because, for example, the PDCCH may or may not be present (may not have been transmitted, or may not have been received), may have a DCI format that may be the same or different than the DCI format that is being monitored by the UE, and/or may have a CRC that is scrambled with a UE identity that is the same as, or different from, the receiving UE (thus, the DCI may be assigned to or intended for the receiving UE, or another UE). Due to this uncertainty regarding each PDCCH, a PDCCH, from the perspective of the UE, may be referred to as a PDCCH candidate. Thus, a PDCCH candidate may be or may include a PDCCH having a DCI format, or scrambled CRC, or other parameter or configuration, which may or may not match what the UE is monitoring or attempting to detect.

As an illustrative example, PDCCH monitoring may include, for example, demodulating a received signal, decoding the demodulated PDCCH or DCI, e.g., to detect that the DCI is (or is not) assigned to or intended for the receiving UE. Thus, decoding of Downlink Control Information (DCI) may use blind decoding where the UE may perform a number of decoding attempts on a number of Physical Downlink Control Channel (PDCCH) candidates for a number of defined DCI formats that are being monitored by the UE. Monitoring may also include performing a CRC check on the decoded PDCCH. To receive a DCI on a PDCCH, a UE monitors a set of PDCCH candidates in one or more configured monitoring occasions (times within one or more slots where PDCCH will be transmitted) in one or more CORESETs according to the search space set configurations. A UE may monitor multiple PDCCH candidates, based on one or more DCI formats, and/or based on its UE identity, for example.

In addition, transmission configuration indicator (TCI) states may be used by a network node (gNB or BS) within a control resource set (or CORESET) to provide beam indications for the UE, which may identify a beam the UE should use for uplink communication and/or downlink communication with the network node or gNB. Each TCI state may be configured or associated with a transmit beam/receive beam pair. Thus, each TCI state may be associated with a particular beam or a specific reference signal. For example, TCI state 1 may be associated with (or may be used to indicate) CSI-RS #5, TCI state 2 may be associated with CSI-RS #9, etc. (where CSI-RS #5, and CSI-RS #9 may be DL reference signals transmitted by the gNB. Thus, in this manner, each TCI state may be associated (or the TCI state may indicate) with a specific reference signal and/or a specific beam. For example, for data transmission via a physical downlink shared channel (PDSCH) and/or via physical uplink shared channel (PUSCH), a UE may be configured by gNB via radio resource control (RRC) message with 128 candidate TCI states. Then, gNB may configure the UE with up to, e.g., 8 (or other number) activated TCI states via a MAC (media access control) control element (MAC CE) that may be piggy-backed (or appended to) a DL (downlink) data transmission to the UE via PDSCH (physical downlink shared channel). Thus, in this manner the gNB may send an activation message to activate (within the UE) the 8 (for example) indicated TCI states of the 128 (for example) candidate TCI states. The UE may be requested by the network node to use a beam associated with any of these 8 (or other number) activated TCI states for communication with the network node or gNB (e.g., for transmitting or receiving data). Dynamically (e.g., such as provided within downlink control information/DCI of each subframe or slot), the gNB may indicate a selection of one of the activated TCI states (and thus, identify a selected beam) for the UE to use for an uplink or downlink data communication (e.g., for a scheduled uplink (UL) or downlink (DL) communication, via PDSCH and/or PUSCH). The DCI (which may, at least in some cases, identify a selected activated TCI state for the UE to use for a communication) may be provided within the PDCCH (physical downlink control channel) transmitted to the UE, e.g., as part of each slot or subframe. In this manner, in some cases, the DCI may be used to provide a fast beam indication, that indicates a selected TCI state (e.g., of a plurality of activated TCI states) that is associated with a reference signal or beam to be used by the UE for UL or DL data communication with the network node (BS or gNB).

A UE may also receive control information (e.g., via radio resource control (RRC) message) indicating a selected TCI state (and thus, beam) to be used by the UE to receive a PDCCH for each CORESET. Thus, each CORESET may be configured with a TCI state. For example, a UE may receive control information indicating that CSI-RS #6 should be used for CORESET #1, and a CSI-RS #9 should be used for CORESET #2. Thus, the UE would use a beam associated with CSI-RS #6 when monitoring CORESET #1 for possible PDCCH transmissions, and the UE would use a beam associated with CSI-RS #9 when monitoring CORESET #2 for possible PDCCH transmissions.

Release 16 of NR provided support for single cell downlink multi-transmission reception points (multi-TRP) (or multiple transmission points), which provides the possibility of downlink data to be transmitted via PDSCH (physical downlink shared channel) simultaneously from two different transmission points (TRPs), which may be separated geographically, but are provided within the same cell (e.g., transmissions of downlink data from two different radio heads or other nodes to a UE within a cell).

For single cell, single DCI-based multi-TRP transmission, a single DCI schedules a single PDSCH, where multiple ways of transmitting PDSCH can be supported. In single DCI-based multi-TRP SDM (spatial division multiplexing) transmission scheme, multi-layer PDSCH is scheduled by a single DCI, where different PDSCH layers may be transmitted from different TRPs. Although, the multiple TRPs will transmit a single transport block. Similarly, there are several other single DCI-based multi-TRP transmission schemes following FDM (frequency division multiplexing) and TDM (time division multiplexing) approaches of multi-TRP transmission.

For single cell, multi-DCI multi-TRP transmission, there is one PDSCH (physical downlink shared channel, or downlink data channel) with an associated transport block transmitted from each TRP, and with each PDSCH being scheduled by separate DCIs carried by separate PDCCH (physical downlink control channels). As the two PDSCHs can be received by the UE independently, there may be two transport blocks, one from each TRP. As a consequence, there will also be two separate HARQ feedbacks (ACK/NAKs) from the UE. There may be a joint HARQ feedback via a single PUCCH (physical uplink control channel), or separate HARQ feedbacks sent via separate PUCCHs.

Figure 2:
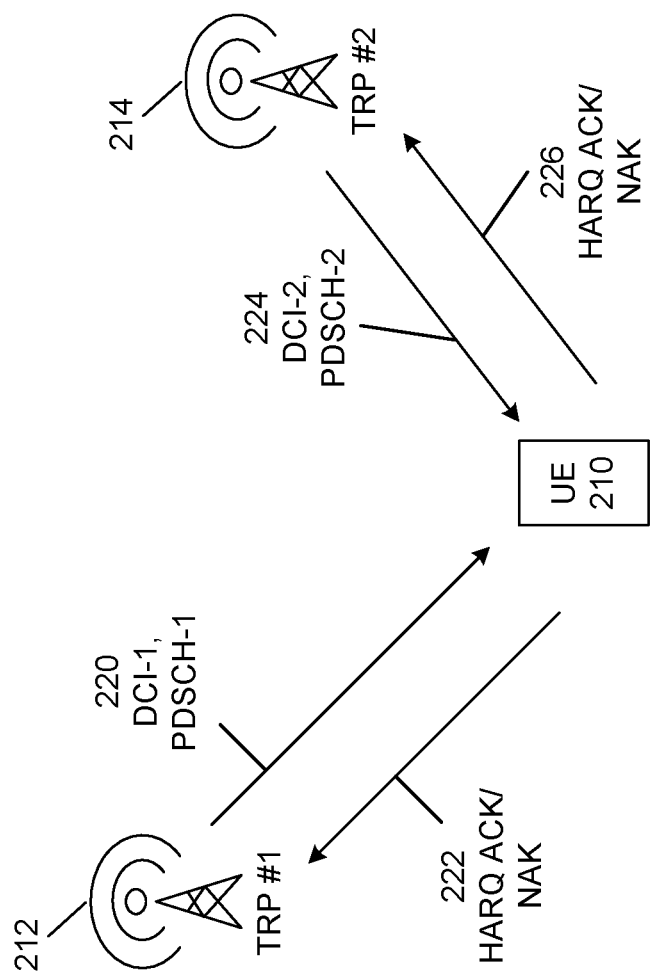
FIG. 2 is a diagram illustrating a single cell, multi-DCI multi-TRP transmission according to an example embodiment.

FIG. 2 is a diagram illustrating a single cell, multi-DCI multi-TRP transmission according to an example embodiment. A UE 210 may be in communication with two TRPs (which may be geographically separated), within a cell. TRP #1 may transmit DCI-1 (provided via a PDCCH-1 not shown) and PDSCH-1, where DCI-1 may schedule downlink PDSCH transmissions from TRP #1 to UE 210 and uplink PUSCH transmissions to TRP #1 from the UE 210. Also, separate HARQ feedback (ACK/NAK) is shown for each TRP. Thus, in this example, TRP #1 may provide or transmit DCI-1 and PDSCH-1 via line 220 to UE 210, and TRP #1 may receive a separate HARQ feedback from UE 210 via line 222. Similarly, TRP #2 may provide or transmit DCI-2 and PDSCH-2 via line 224 to UE 210, and TRP #2 may receive a separate HARQ feedback from UE 210 via line 226. FIG. 2 may illustrate only two TRPs, but it should be understood that in any of the examples herein the TRP (212 and/or 214) may comprise of one or more TRPs (e.g., a set of TRPs) each providing one more reference signals (RS) and one or more CORESETs. As an example, a TRP may refer in some embodiments to a set of TRPs.

Each CORESET may include a value (0, or 1) configured as CORESETPoolIndex by RRC signaling sent to the UE. Within PDCCH configuration, there can be multiple CORESETs and each CORESET may be associated with one of these CORESETPoolIndex values. The CORESETPoolIndex values, thus, separate CORESETs into (e.g., two) different groups. A group of CORESETs are considered to schedule one set of uplink and downlink channels (PDCCH/PDSCH/PUSCH/PUCCH) for the UE with respect to each TRP. When the UE is configured with more than one value for CORESETPoolIndex for its CORESETs, the UE assumes multi-DCI based multi-TRP operation (intracell), which includes the UE monitoring DCI from multiple TRPs (could be different radio heads within a cell), and receiving data scheduled by corresponding DCIs, as shown in FIG. 2. Thus, in this case, various aspects or parameters of multi-TRP operation may be defined or configured for each TRP based on the CORESETPoolIndex having two values (e.g., with some CORESETS of the UE have a CORESETPoolIndex set to 0, and some CORESETS of the UE set to 1, as a way to group the CORESETs into different groups for multi-TRP operation). The various aspects or parameters of multi-TRP operation may be defined or configured separately for each TRP, e.g., including how the scrambling of PDSCH is performed, PDCCH monitoring, rate matching, separate or combined HARQ feedback from UE for both TRPs, scheduling of in order/out of order data for transmission, and other multi-TRP operation parameters or settings.

Currently in 3GPP, two different tracks discuss possible inter-cell operation (UE monitoring and/or receiving signals from two different cells) within a beam management framework: 1) inter-cell multi-TRP operation using multi-TRP framework (which uses CORESETPoolIndex values) where UE can be configured to at least monitor signals of a serving cell and non-serving cell; and 2) (L1/L2 (Layer 1/Layer 2)-centric) inter-cell "mobility", where UE can be configured to receive serving cell and non-serving cell signals/channels. The cells that are part of inter-cell operation are labeled as serving cell and non-serving cell. However, in some scenarios L1/L2-centric inter-cell mobility may not use or configure CORESETPoolIndex values. However, as further described herein, it may be desirable, at least for some scenarios or applications, for a UE to perform (or be able to perform) multi-TRP operation, even when CORESETPoolIndex values may not be configured.

In Release 17, the current Rel 16 multi-TRP framework may be extended for inter-cell multi-TRP operation. In one possible operation mode, the serving cell configuration includes a CORESET associated to a non-serving cell and the inter-cell operation is facilitated by assigning the non-serving cell CORESETs with different CORESETPoolIndex values. In this framework the UE assumes that CORESETs configured with same CORESETPoolIndex values are assumed to be coordinating such that no overlapping transmissions are scheduled by the CORESETs configured with the same CORESETPoolIndex.

In addition, the inter-cell operation is also considered in another track that aims to specify operation L1/L2 centric inter-cell operation/mobility where there is currently discussions to support measurements of non-serving cell signals (DL reference signals such as SSB/CSI-RS) within the beam management framework and further the reception of downlink channels (PDCCH, PDSCH) from and transmission of UL channels to non-serving cell (PUSCH, PUCCH).

From downlink perspective the PDCCH reception from a non-serving cell may require support for beam indication for a CORESET, e.g., activation of a TCI state for a CORESET where the TCI state is configured with a QCL source reference signal of a non-serving cell. For UE to differentiate that DL reference signal/channels is transmitted from (or associated with) a non-serving cell, a PCI (a physical cell identity for a cell) value may be used, e.g., the PCI value may be configured per respective DL reference signal/channel. Other association methods may also be used. In the case of inter-cell (or multi-cell) multi-TRP operation, the UE may typically be explicitly configured (using RRC) by a higher layer parameters (e.g., with an CORESETPoolIndex value) to indicate the multi-TRP operation. However, in the case of L1/L2 centric inter-cell operation/mobility, it is not yet defined how the multi-TRP support is configured (how UE will be configured to perform multi-TRP operation for such use case), or how the UE may determine that it is being configured for multi-TRP operation, where the UE may be assumed to monitor PDCCH from multiple cells at the same time.

Therefore, according to an example embodiment, techniques are provided that may allow a UE to determine when it is configured for (and thus when it should perform or operate according to) inter-cell multi-DCI based multi-TRP operation, e.g., even without explicit higher layer configuration for such multi-TRP operation (e.g., even in the absence of configuring CORESETPoolIndex values for different CORESETs, that would typically configure UE for multi-DCI based multi-TRP operation).

Figure 3:
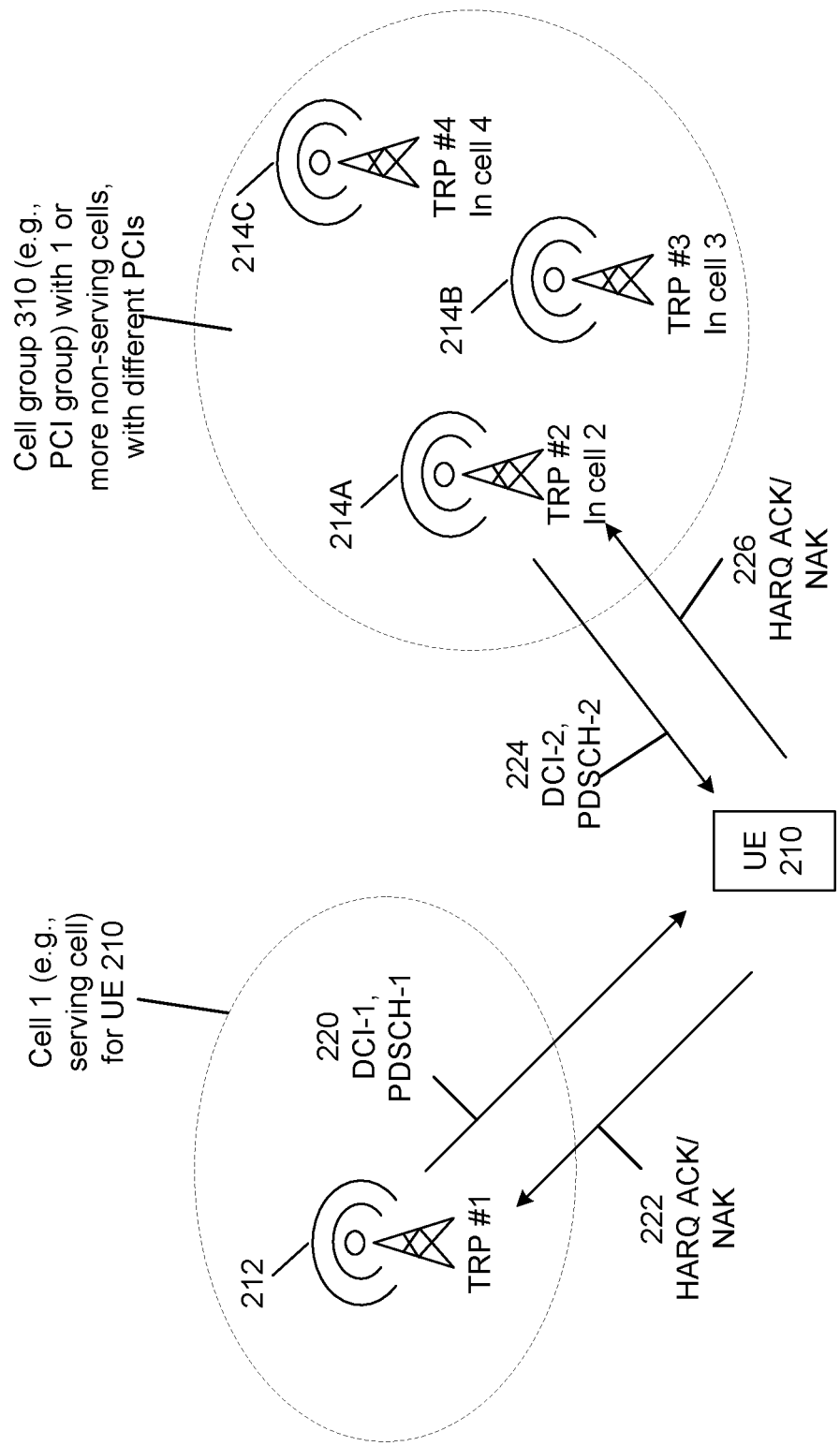
FIG. 3 is a diagram illustrating inter-cell (or multi-cell), multi-DCI based multi-TRP transmission according to an example embodiment.

FIG. 3 is a diagram illustrating inter-cell (or multi-cell), multi-DCI based multi-TRP transmission according to an example embodiment. A UE 210 may be in communication with multiple TRPs that are provided in multiple cells. Each cell may be identified by a PCI. TRP #1 (212) is provided in cell 1, which may be a serving cell. There also may be one or more cell groups, where each cell group may include one or more non-serving cells. For example, cell group 310 may include TRPs (e.g., gNBs, radio heads or other devices or node) of multiple cells, such as TRP #2 (214A, in cell 2), TRP #3 (214B, in cell 3), and TRP #4 (214C, in cell 4).

Figure 4:
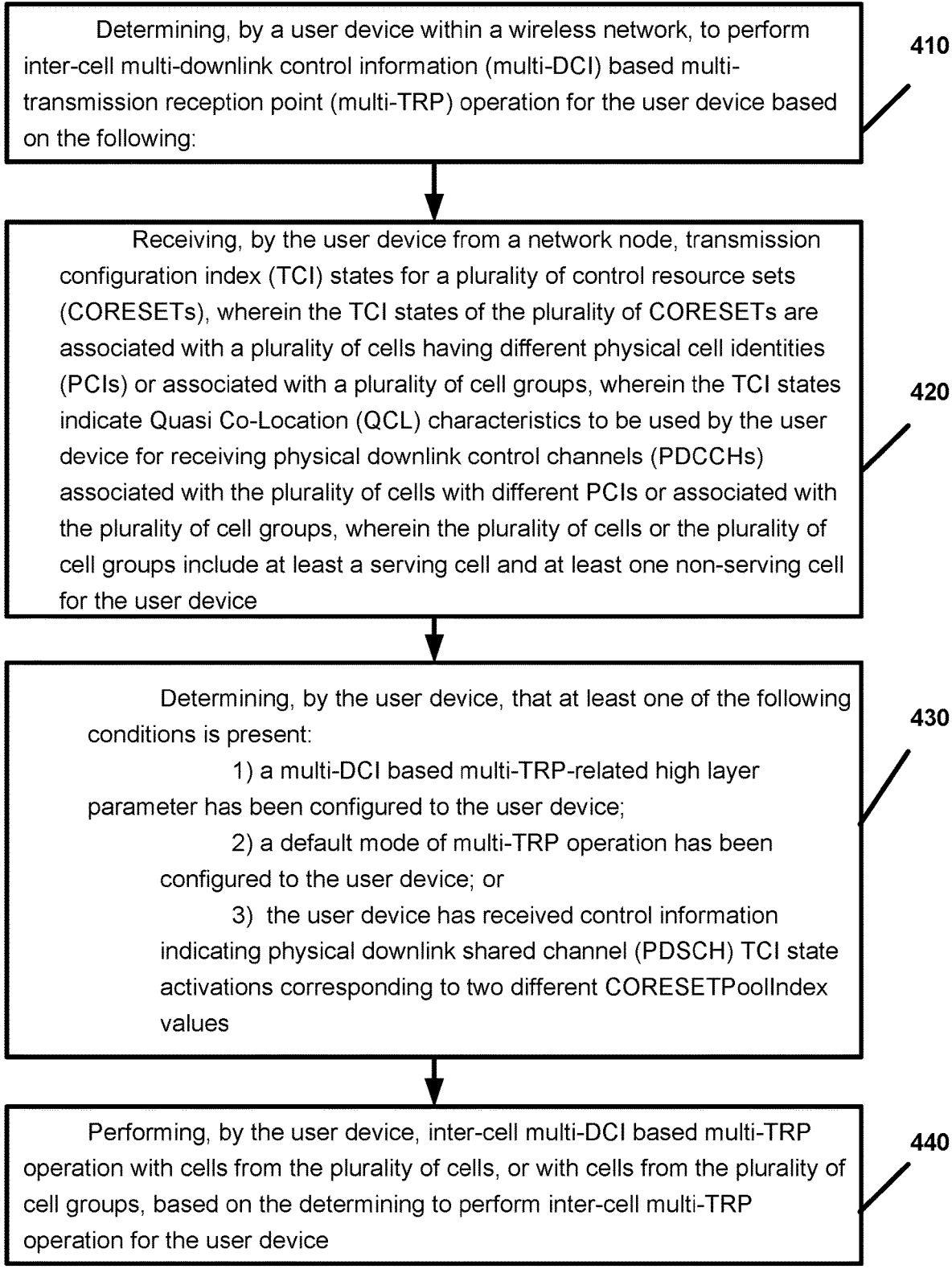
FIG. 4 is a flow chart illustrating operation of a user device (or UE) according to an example embodiment.

FIG. 4 is a flow chart illustrating operation of a user device (or UE) according to an example embodiment. Operation 410 includes determining, by a user device (UE) within a wireless network, to perform inter-cell multi-downlink control information (multi-DCI) based multi-transmission reception point (multi-TRP) operation for the user device based on the following: Operation 420 includes receiving, by the user device from a network node, transmission configuration index (TCI) states for a plurality of control resource sets (CORESETS), wherein the TCI states for the plurality of CORESETs are associated with a plurality of cells having different physical cell identities (PCIs) or associated with a plurality of cell groups, wherein the TCI states indicate Quasi Co-Location (QCL) characteristics (e.g., beams) to be used by the user device for receiving physical downlink control channels (PDCCHs) associated with the plurality of cells with different PCIs or associated with the plurality of cell groups, wherein the plurality of cells or the plurality of cell groups include at least a serving cell and at least one non-serving cell for the user device. And, operation 430 includes determining, by the user device, that at least one of the following conditions is present: 1) a multi-DCI based multi-TRP-related high layer parameter has been configured to the user device; 2) a default mode of multi-TRP operation has been configured to the user device; or 3) the user device has received control information indicating physical downlink shared channel (PDSCH) TCI state activations corresponding to two different CORESETPoolIndex values. And, operation 440 includes performing, by the user device, inter-cell multi-DCI based multi-TRP operation with cells from the plurality of cells, or with cells from the plurality of cell groups, based on the determining to perform multi-DCI based inter-cell multi-TRP operation.

Therefore, as described in the flow chart of FIG. 4, the UE determines (at operation 410) to perform inter-cell (or multi-cell) multi-DCI based multi-TRP operation based on both the receiving operation 420, and at least one of the three conditions indicated of operation 430 being present. Then, at operation 440 of FIG. 4, the user device (UE) performs inter-cell multi-DCI based multi-TRP operation with cells from the plurality of cells, or with cells from the plurality of cell groups, based on the determining (at operation 410) to perform inter-cell multi-TRP operation for the user device.

For example, based on the example flow chart of FIG. 4, the UE may perform inter-cell multi-DCI based multi-TRP operation with the cells from the plurality of the cells, or with the cells from the plurality of cell groups, wherein the user device has not been explicitly configured, via setting of CORESETPoolIndex values for the user device to more than one value for CORESETs. In this manner, for example, for some applications or use cases, such as (by way of example) L1/L2-centric inter-cell mobility (which does not use or configure CORESETPoolIndex values) the UE may determine to perform inter-cell multi-DCI based multi-TRP operation (e.g., even when higher layer signaling, such as CORESETPoolIndex, is not used by such application or use case to configure multi-DCI based multi-TRP).

Also, according to an example embodiment, the performing inter-cell multi-DCI based multi-TRP operation with a plurality of cells, or with the cells from the plurality of cell groups may include the UE performing at least one of the following with respect to a first TRP that includes a serving cell, and a second TRP that includes at least one non-serving cell:

1) a separate channel monitoring, data processing, and/or a separate receiving and/or transmission of control and data, with respect to a set of (or one or more of) channels (PUCCH/PUSCH/PDSCH/PDCCH) corresponding to each of the serving cell and the at least one non-serving cell;

2) separately monitoring of downlink control information (DCI) on separate PDCCHs from each of the serving cell and the at least one non-serving cell;

3) receiving of downlink data scheduled by DCIs and received via corresponding PDSCH channels, for each of the serving cell and the at least one non-serving cell;

4) descrambling of PDSCH channel separately for PDSCH from the serving cell and the at least one non-serving cell;

5) performing separate PUSCH scheduling of uplink data transmission, based on corresponding DCI, for each of the serving cell and the at least one non-serving cell; or sending Hybrid ARQ (HARQ) feedback for the serving cell and the non-serving cell.

6) performing (e.g., separate) beam failure detection (and recovery), with respect to each TRP, using respective sets of BFD-RS (q0-0 and q0-1) for serving-cell and non-serving cell determined based on the methods. As an example UE may determine to perform beam failure detection for first TRP that includes a serving cell, and a second TRP that includes at least one non-serving cell using the respective sets of BFD-RS (beam failure detection-reference signal) (e.g. q0-0 for first TRP and q0-1 for the second TRP). To determine the BFD-RS (that may be one or more of CSI-RSs and/or SSBs) to be included in the respective sets for each TRP, the UE may be based on the PCI as described herein. The UE may determine to perform beam failure detection according to multiple sets of q0 when not explicitly configured with a CORESETPoolIndex. As a further example when the UE has determined to perform (inter-cell) multi-DCI based multi-TRP operation as if CORESETPoolIndex values were configured (e.g., based on the groups of PCI or two or more distinct values of PCIs) as described herein, UE may determine the first BFD-RS to include the RS indicated by the active TCI States for the CORESETs determined to be associated with CORESETPoolIndex=0 and the second BFD-RS to include the RS indicated by the active TCI States for the CORESETs determined to be associated with CORESETPoolIndex=1. When the UE determines that is not performing inter-cell multi-DCI based multi-TRP operation, it may determine to use one set of BFD-RS (e.g. set of q0).

Performing inter-cell multi-DCI based multi-TRP operation may include, or may involve, one or more actions or operations, and some examples of these operations are listed above, by way of illustrative examples. Performing inter-cell multi-DCI based multi-TRP operation may include different and/or additional operations. Also, as noted, inter-cell multi-DCI based multi-TRP operation may be performed by the UE, even though the UE has not been explicitly configured, via setting of CORESETPoolIndex values, for this mode of operation. Also, for example, the performing (operation 440), by the user device (UE), inter-cell multi-DCI based multi-TRP operation with cells from the plurality of the cells, or with cells from the plurality of cell groups, may be performed by the user device as if CORESETPoolIndex values were configured, based on a lowest PCI among two PCIs representing the CORESETPoolIndex=0, and the highest PCI among the two PCIs representing CORESETPoolIndex=1, even though the user device has not been explicitly configured for multi-TRP operation via setting of CORESETPoolIndex values to more than one value for CORESETs.

Similarly, other assignments of PCIs or PCI groups to different CORESETPoolIndex values may be used, such as, for example:

a highest PCI among two PCIs representing the CORESETPoolIndex=0, and the lowest PCI among the two PCIs representing CORESETPoolIndex=1;

a serving cell PCI among two PCIs representing the CORESETPoolIndex=0, and the non-serving cell PCI among the two PCIs representing CORESETPoolIndex=1;

a predefined PCI among two PCIs representing the CORESETPoolIndex=0, and a remaining PCI among the two PCIs representing CORESETPoolIndex=1;

a first cell group (e.g., having a lowest cell group index, or a highest cell group index among cell groups) represents CORESETPoolIndex=0, and a second cell group represents CORESETPoolIndex=1.

Also, different techniques may be used to inform (or communicate to) the UE the PCIs for each of the cell groups, such as for example:

1) receiving, by the UE from the network node, a message or signaling that indicates PCIs assigned to a cell group;

2) receiving, by the UE from the network node, a measurement configuration that also indicates PCIs assigned to a cell group. Thus, various messages or signaling may be used to explicitly indicate PCIs that are included within one or more cell groups; and/or 3) receiving, by the UE, a media access control-control element (MAC-CE) indicating PDSCH TCI state activations for two different CORESETPoolIndex values, and wherein each TCI state activation is associated with a PCI; and, determining, by the UE, a cell group that includes the PCIs associated with TCI state activations received via the MAC-CE for the CORESETPoolIndex value. Thus, in this manner, PCIs for a cell group may be determined based on MAC-CE indicating PDSCH TCI state activations, and then assigning the associated PCI states of these TCI state activations to a cell group.

Also, after performing inter-cell multi-DCI based multi-TRP operation, conditions may change, that may cause the UE to change or switch modes of operation from multi-TRP operation to a single TRP operation. For example, this may include: receiving, by the UE from the network node, updated TCI states for a plurality of CORESETS, wherein the TCI states of the plurality for CORESETs are associated only with one PCI or one cell group; and changing operation of the UE from the inter-cell multi-DCI based multi-TRP operation to a single TRP operation, based on the receiving the updated TCI states.

Also, in an example embodiment, in response to the UE receiving TCI state activations for CORESETs where different TCI states for respective CORESETs are associated with at least two different physical cell identities (PCIs), indicating (or which indicates to the UE) inter-cell multi-DCI based multi-TRP operation, the UE performs or operates as if it has been configured with a CORESETPoolIndex value in ControlResourceSet (CORESET), and the UE determines that the CORESET associated with the serving cell PCI as a CORESET having a CORESETPoolIndex=0.

In an example embodiment, when a CORESET is not associated with a PCI (e.g., the DL RS (downlink reference signal) indicated by the active TCI state for a CORESET is not explicitly associated with a PCI, or the CORESET is not associated through other configuration), UE may determine the CORESET as a CORESET having a CORESETPoolIndex=0. The TCI state may be associated with a serving cell index, which may be further associated with a PCI. Through this association UE may determine that the CORESET is associated with a serving cell PCI and UE determine the CORESET (or CORESETs) as a CORESET having a CORESETPoolIndex=0.

Further details and illustrative examples will now be described.

A UE receives a configuration that provides information related to non-serving cell measurements, where information provides the details for measuring non-serving cell SSBs. In one variant, this configuration may carry additional information indicating the use of non-serving cell measurements are for multi-TRP operation or another mode of operation (e.g. L1/L2 centric mobility). In another variant (also mentioned below), this information may carry additional information to grouping non-serving cells implicitly/explicitly where a group may coordinate when transmitting PDCCH and PDSCH (only one cell may be active at a given time to serve the UE).

For grouping non-serving cells (grouping of PCIs), DL reference signals (RS) (e.g., synchronization signal blocks (SSBs)) may be grouped where each group of DL RS associated with multiple PCIs, which could be understand as a PCI group.

In one example, UE may assume the reception of PDCCH/PDSCH or transmission of PUCCH/PUSCH from one of the non-serving cell at the a time.

The UE may receive further configuration/indication to perform beam measurements and report non-serving cell SSB and CSI-RS beams. In one example, the network may configure csi-reporting/beam reporting configuration per non-serving cell.

Understanding the Multi-TRP Operation

A) For the UE that supports the multi-TRP operation (based on UE capability) and non-serving cell beam measurements and reporting, the UE may assume (or determine to perform) the multi-TRP operation based on the following (e.g., such as when the CORESETPoolIndex is not configured).

If the UE receives the beam activation/indications for CORESETs, i.e. the DL reference signal (RS) indicated by the active TCI States (the beams of) for the CORESETs are associated with a plurality of cells or a plurality of cell groups (e.g., for the CORESETs associated with at least two different PCIs (e.g., serving cell and with another cell) or PCI groups), and UE support either option 1, option 2 or option 3 (indicated below).

Option 1: If at least one of the below legacy configurations (high-layer parameters) is configured/indicated (such as for example), or if more than 1 high layer multi-TRP related parameter is configured for the UE, for a particular parameter type, such as for example: 1) More than three CORESETs are configured to the UE for DL BWP (downlink bandwidth part). In one example, the CORESET with index higher than the third CORESET index in order is considered to be associated with other CORESETPoolindex value (e.g., value=1); 2) More than one scrambling sequence is configured to the UE. 3) More than one rate matching pattern for LTE-CRS is configured to the UE. 4) Joint/separate HARQ reporting is configured to the UE. 5) Any other Multi-TRP-related high-layer parameter is configured to the UE.

Option 2: A default mode of multi-TRP operation has been configured to the user device. In this option, a legacy RRC operation (no high layer multi-TRP operation) parameter related to multi-TRP operation may not be configured/indicated, but a default mode of operation may be defined/assumed by the UE without relying on higher-layer parameters. e.g., a default scrambling sequence used for PDSCH and which may be defined as PCI associated with the TCI state of the PDSCH, default HARQ operation may assume a separate feedback mode, etc., Option 3: The UE has received control information indicating physical downlink shared channel (PDSCH) TCI state activations corresponding to two different CORESET-PoolIndex values. Thus, for example, for this option, the UE receives MAC-CE commands for PDSCH TCI state activations corresponding to two different CORESETPoolIndex values (indicated in the MAC-CE command defined for Rel-16). For example, the CORESET grouping (associated to different PCIs or PCI grouping/cell group) may be determined or derived based on the PCIs associated with activated TCI states of PDSCH within a given CORESET-PoolIndex (indicated in MAC-CE). This may also be used to update any PCI grouping (cell group) or PCIs associated with a CORESETPoolIndex more dynamically (without necessarily relying on PCI grouping from above).

B) When the UE determines multi-TRP operation is supported based on the above, the UE may assume each CORESETPoolIndex value corresponding to one PCI (or PCI group) to follow legacy-defined multi-TRP operation steps by following corresponding legacy operations defined for CORESETPoolIndex. In other words, when the UE determines (or confirms) inter-cell multi-DCI based multi-TRP operation based on the above description, the UE may perform inter-cell multi-DCI based multi-TRP operation with cells from the plurality of the cells, or with cells from the plurality of cell groups, e.g., even though the UE has not been explicitly configured via higher layer signaling for such inter-cell multi-DCI based multi-TRP operation (e.g., setting of CORESETPoolIndex values may not have been performed to more than one value for CORESETs for the UE). The UE performing perform inter-cell multi-DCI based multi-TRP operation may include, e.g., for each TRP, PDCCH monitoring, scrambling of PDSCH, rate matching, HARQ, PUSCH scheduling, in-order/out-of-order, default beam assumptions, and other behaviors.

C) Additional features or considerations may be applied, depending on the number of PCIs associated with CORESETs.

If CORESETs are only associated with two PCIs: the lowest (or serving cell/highest/predefined) PCI among two PCIs may represent the CORESETPoolIndex=0, and the other PCI may represent CORESETPoolIndex=1. In this option, the UE performs or assumes multi-TRP operation as if the CORESETPoolIndex value would have been configured without receiving explicit indication for the CORESETs. As an example, the PDCCH reception associated with first PCI may be considered to be from a CORESETPoolIndex=0 and the PDCCH reception on (or associated with) a second PCI may be considered from a CORESETPoolIndex=1.

If CORESETs are associated with more than two PCIs: In one variant, the UE may assume more than two CORESET-PoolIndex values corresponding to the different PCIs, extending the legacy framework to more than two PDCCH/PDSCH reception. In another variant of the grouping of non-serving cells (PCI grouping/cell group) where the configuration provides the cell or PCI grouping, the lowest indexed PCI group among two PCI groups may represent the CORESETPoolIndex=0 other PCI group may represent CORESETPoolIndex=1.

When updating PCIs in a group or replacing a PCI group based on the TCI State activation MAC-CE for PDSCH (option 3 above), separate MAC-CE commands corresponding to different CORESETPoolIndex may be received and used directly as respective CORESETPoolIndex values.

D) Possibility of single-TRP (S-TRP) operation without RRC reconfiguration. The UE may assume (or resume operation of) the single-TRP operation based on the beam activation/indication for CORESETs when the DL RS indicated by the active TCI state or states (beams) for CORESET(s) are associated only with one PCI (or PCI group). For example, the UE may receive from the network node (e.g., gNB) updated TCI states for a plurality of CORESETS, wherein the TCI states for the plurality of CORESETs are associated only with one PCI or one cell group; and, the UE may switch or change (or resume) operation of the UE from the inter-cell multi-DCI based multi-TRP operation to a single TRP operation, based on the receiving the updated TCI states.

Figure 5:
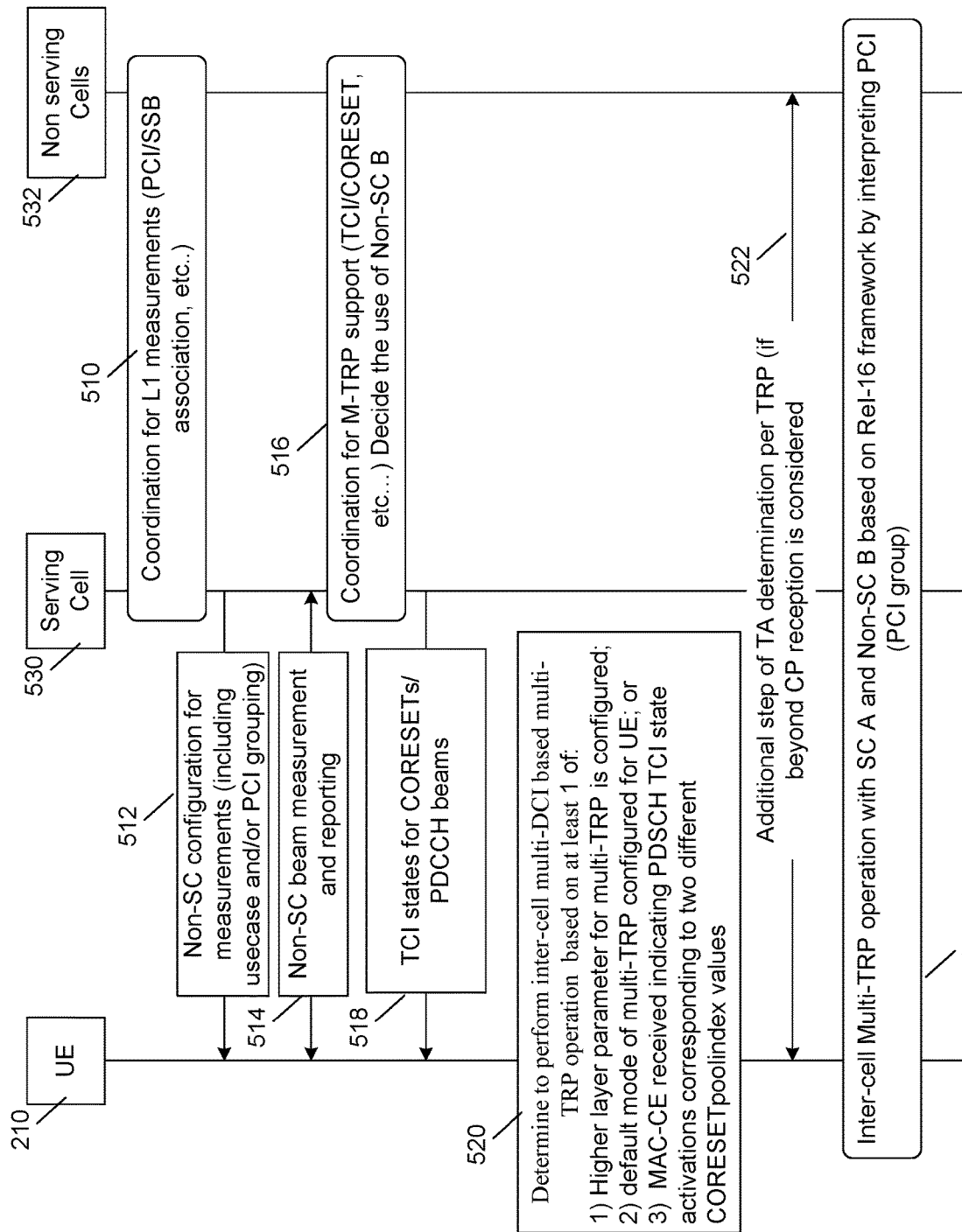
FIG. 5 is a diagram illustrating operation according to an example embodiment.

FIG. 5 is a diagram illustrating operation according to an example embodiment. A UE 210 is shown, and may be in communication with one or more cells, including a serving cell 530, and a (or one or more) non serving cells 532. At 510, the serving cell 530 and non-serving cells may coordinate regarding L1 measurements, e.g., such as coordinating or determining a CSI-RS, or SSB beam measurement report configuration for the UE 210. At 512, the serving cell 530 may provide or transmit to UE 210 a non-serving cell configuration for measurements, including a use case (e.g., L1/L2 centric inter-cell operation/mobility, or other use case for multi-TRP); PCIs assigned to a cell group (PCI group)

may also be indicated to UE 210 at message 512. At 514, UE 210 performs non-serving cell beam measurement and reporting to serving cell 530. At 516, serving cell 530 and non-serving cell(s) may coordinate to determine CORESET assignments among serving and non-serving cells, for example.

At 518, the UE receives transmission configuration index (TCI) states for a plurality of control resource sets (CORESETS), wherein the TCI states for the plurality of CORESETs are associated with a plurality of cells having different physical cell identities (PCIs) or associated with a plurality of cell groups, e.g., wherein the TCI states indicate Quasi Co-Location (QCL) characteristics to be used by the user device for receiving physical downlink control channels (PDCCHs) associated with at least two different cells with different PCIs or associated with at least two different cell groups, wherein the plurality of cells or cell groups include at least a serving cell and at least one non-serving cell for the user device;

At 520, the UE 210 determines that at least one of the the following three options or conditions is present: 1) a multi-DCI based multi-TRP-related high layer parameter has been configured to the user device; 2) a default mode of multi-TRP operation has been configured to the UE; or 3) the UE has received control information (e.g., MAC-CE) indicating physical downlink shared channel (PDSCH) TCI state activations corresponding to two different CORESETPoolIndex values. Operation 522 may include determining a timing advance (TA) per TRP.

Operation 524 may include the UE 210 performing inter-cell multi-DCI based multi-TRP operation with a plurality of the cells, including serving cell 530, and a non-serving cell 532. Thus, for example, the UE 210 may perform inter-cell multi-DCI based multi-TRP operation as if CORESETPoolIndex values were configured, e.g., based on a lowest PCI among two PCIs representing the CORESETPoolIndex=0, and the highest PCI among the two PCIs representing CORESETPoolIndex=1, even though the UE 210 has not been explicitly configured for multi-TRP operation via setting of CORESETPoolIndex values to more than one value for CORESETs.

Some further examples will be described:

Example 1. An apparatus comprising: at least one processor; and at least one memory including computer program code; the at least one memory and the computer program code configured to, with the at least one processor, cause the apparatus at least to: determine, by a user device within a wireless network, to perform inter-cell multi-downlink control information (multi-DCI) based multi-transmission reception point (multi-TRP) operation for the user device based on the following: receive, by the user device from a network node, transmission configuration index (TCI) states for a plurality of control resource sets (CORESETs), wherein the TCI states for the plurality of CORESETs are associated with a plurality of cells having different physical cell identities (PCIs) or associated with a plurality of cell groups, wherein the TCI states indicate Quasi Co-Location (QCL) characteristics to be used by the user device for receiving physical downlink control channels (PDCCHs) associated with the plurality of cells with different PCIs or associated with the plurality of cell groups, wherein the plurality of cells or the plurality of cell groups include at least a serving cell and at least one non-serving cell for the user device; and determine, by the user device, that at least one of the following conditions is present: 1) a multi-DCI based multi-TRP-related high layer parameter has been configured to the user device; 2) a default mode of multi-TRP operation has been configured to the user device; or 3) the user device has received control information indicating physical downlink shared channel (PDSCH) TCI state activations corresponding to two different CORESETPoolIndex values; and perform, by the user device, inter-cell multi-DCI based multi-TRP operation with cells from the plurality of cells, or with cells from the plurality of cell groups, based on the determining to perform multi-DCI based inter-cell multi-TRP operation.

Example 2. The apparatus of Example 1 wherein the computer program code is configured to, with the at least one processor, cause the apparatus to perform, by the user device, inter-cell multi-DCI based multi-TRP operation with the cells from the plurality of cells, or with the cells from the plurality of cell groups, wherein the user device has not been explicitly configured, via setting of CORESETPoolIndex values for the user device to more than one value for CORESETs, for inter-cell multi-DCI based multi-TRP operation.

Example 3. The apparatus of any of Examples 1-2, wherein the computer program code configured to, with the at least one processor, cause the apparatus to perform, by the user device, inter-cell multi-DCI based multi-TRP operation with the cells from the plurality of cells, or with the cells from the plurality of cell groups comprises the computer program code configured to, with the at least one processor, cause the apparatus to perform at least one of the following with respect to a first TRP that includes the serving cell, and a second TRP that includes the at least one non-serving cell: a separate channel monitoring, data processing, and/or a separate receiving and/or transmission of control and data, with respect to a set of channels (PUCCH/PUSCH/PDSCH/PDCCH) corresponding to each of the serving cell and the at least one non-serving cell; separately monitoring of downlink control information (DCI) on separate PDCCHs from each of the serving cell and the at least one non-serving cell; receiving of downlink data scheduled by DCIs and received via corresponding PDSCH channels, for each of the serving cell and the at least one non-serving cell; descrambling of PDSCH channel separately for PDSCH from the serving cell and the at least one non-serving cell; performing separate PUSCH scheduling of uplink data transmission, based on corresponding DCI, for each of the serving cell and the at least one non-serving cell; performing separate beam failure detection and/or beam failure recovery, with respect to the serving cell and with respect to the non-serving cell; or sending Hybrid ARQ (HARQ) feedback for the serving cell and the non-serving cell.

Example 4. The apparatus of any of Examples 1-3 wherein the computer program code configured to, with the at least one processor, cause the apparatus to perform, by the user device, inter-cell multi-DCI based multi-TRP operation with the cells from the plurality of cells, or with the cells from the plurality of cell groups is performed by the user device as if CORESETPoolIndex values were configured, even though the user device has not been explicitly configured for multi-TRP operation via setting of CORESETPoolIndex values to more than one value for CORESETs, based on at least one of the following: 1) a lowest PCI among two PCIs representing the CORESETPoolIndex=0, and the highest PCI among the two PCIs representing CORESETPoolIndex=1; 2) a highest PCI among two PCIs representing the CORESETPoolIndex=0, and the lowest PCI among the two PCIs representing CORESETPoolIndex=1; 3) a serving cell PCI among two PCIs representing the CORESETPoolIndex=0, and the non-serving cell PCI among the two PCIs representing CORESETPoolIndex=1;

or 4) a predefined PCI among two PCIs representing the CORESETPoolIndex=0, and a remaining PCI among the two PCIs representing CORESETPoolIndex=1.

Example 5. The apparatus of any of Examples 1~4 wherein the computer program code configured to, with the at least one processor, cause the apparatus to perform, by the user device, inter-cell multi-DCI based multi-TRP operation with the cells from the plurality of cells, or with the cells from the plurality of cell groups, is performed by the user device based on more than two CORESETPoolIndex values that correspond to different PCIs or different cell groups.

Example 6. The apparatus of any of Examples 1-5, wherein a first cell group represents CORESETPoolIndex=0, and a second cell group represents CORESETPoolIndex=1.

Example 7. The apparatus of any of Examples 1-6, wherein the first and second cell groups each include a plurality of non-serving cells.

Example 8. The apparatus of any of Examples 1-7, wherein 3) the user device has received control information indicating physical downlink shared channel (PDSCH) TCI state activations corresponding to two different CORESETPoolIndex values comprises: the user device has received a medium access control-control element (MAC-CE) indicating PDSCH TCI state activations for two different CORESETPoolIndex values, and wherein each TCI state activation is associated with a PCI; the method further comprising determining, by the user device, a cell group that includes the PCIs associated with TCI state activations received via the MAC-CE for the CORESETPoolIndex value.

Example 9. The apparatus of any of Examples 1-8, further comprising: the computer program code configured to, with the at least one processor, cause the apparatus to receive, by the user device from the network node, a message or signaling that indicates PCIs assigned to a cell group.

Example 10. The apparatus of any of Examples 1-9, further comprising: the computer program code is configured to, with the at least one processor, cause the apparatus to: receive, by the user device from the network node, a measurement configuration that also indicates PCIs assigned to a cell group.

Example 11. The apparatus of any of Examples 1-10, wherein the computer program code is configured to, with the at least one processor, cause the apparatus to further perform, by the user device: receive, by the user device from the network node, updated TCI states for the plurality of CORESETs, wherein the TCI states for the plurality of CORESETs are associated only with one PCI or one cell group; and change operation of the user device from the inter-cell multi-DCI based multi-TRP operation to a single TRP operation, based on the receiving the updated TCI states.

Example 12. The apparatus of any of Examples 1-11, wherein, in response to the user device receiving TCI state activations for CORESETs where different TCI states for respective CORESETs are associated with at least two different physical cell identities (PCIs), indicating inter-cell multi-DCI based multi-TRP operation, the user device performs or operates as if it has been configured with a CORESETPoolIndex value in ControlResourceSet (CORESET), and the user device determines that the CORESET associated with the serving cell PCI as a CORESET having a CORESETPoolIndex=0.

Example 13. The apparatus of any of Examples 1-12, further comprising: the computer program code is configured to, with the at least one processor, cause the apparatus to: in response to the user device receiving TCI state activations for CORESETs where different TCI states for respective CORESETs are associated with at least two different physical cell identities (PCIs), perform, by the user device, beam failure detection using respective sets of BFD-RS (beam failure detection reference signals) wherein the reference signal (RS) for respective sets of BFD-RS are determined based on the associated PCI values for the CORESETs of the serving-cell and the at least one non-serving cell.

Example 14. The apparatus of any of Examples 1-13, wherein 1) a multi-DCI based multi-TRP-related high layer parameter has been configured to the user device comprises one or more of the following: more than three CORESETs are configured to the user device for a downlink bandwidth part (DL BWP); more than one scrambling sequence is configured to the user device; more than one rate matching pattern for LTE-CRS (LTE cell specific reference signal) is configured to the user device; either joint or separate HARQ feedback reporting is configured to the user device; and/or a multi-TRP-related high-layer parameter is configured to the user device.

Example 15. The apparatus of any of Examples 1-14, wherein 2) a default mode of multi-TRP operation has been configured to the user device comprises one or more of the following behaviors at the user device: the user device expects non-overlapping PDSCH reception; the user device expects overlapping and partially overlapping PDSCH reception with scrambling sequences defined based on the PCI applicable for associating CORESETPoolIndex value; the user device operates with separate HARQ feedback operation; the user device operates assuming pre-defined assumption for blind decode limit calculations; the user device assumes rate matching over union of CRS resources configured for both serving cell and non-serving cells; the user device expects in-order transmissions for PDCCH-PDSCH and PDCCH-PUSCH; and/or the user device follows any other pre-defined user device behavior when the condition of the plurality of CORESETs are associated with a plurality of cells having different physical cell identities (PCIs) or associated with different cell groups is satisfied.

Example 16. A non-transitory computer-readable storage medium comprising instructions stored thereon that, when executed by at least one processor, are configured to cause a computing system to: determine, by a user device within a wireless network, to perform inter-cell multi-downlink control information (multi-DCI) based multi-transmission reception point (multi-TRP) operation for the user device based on the following: receive, by the user device from a network node, transmission configuration index (TCI) states for a plurality of control resource sets (CORESETs), wherein the TCI states for the plurality of CORESETs are associated with a plurality of cells having different physical cell identities (PCIs) or associated with a plurality of cell groups, wherein the TCI states indicate Quasi Co-Location (QCL) characteristics to be used by the user device for receiving physical downlink control channels (PDCCHs) associated with the plurality of cells with different PCIs or associated with the plurality of cell groups, wherein the plurality of cells or the plurality of cell groups include at least a serving cell and at least one non-serving cell for the user device; and determine, by the user device, that at least one of the following conditions is present: 1) a multi-DCI based multi-TRP-related high layer parameter has been configured to the user device; 2) a default mode of multi-TRP operation has been configured to the user device; or 3) the user device has received control information indicating physical downlink shared channel (PDSCH) TCI state activations corresponding to two different CORESETPoolIndex values; and perform, by the user device, inter-cell multi-DCI based multi-TRP operation with the cells from the plurality of cells, or with the cells from the plurality of cell groups, based on the determining to perform multi-DCI based inter-cell multi-TRP operation.

Example 17. A method comprising: determining, by a user device within a wireless network, to perform inter-cell multi-downlink control information (multi-DCI) based multi-transmission reception point (multi-TRP) operation for the user device based on the following: receiving, by the user device from a network node, transmission configuration index (TCI) states for a plurality of control resource sets (CORESETs), wherein the TCI states for the plurality of CORESETs are associated with a plurality of cells having different physical cell identities (PCIs) or associated with a plurality of cell groups, wherein the TCI states indicate Quasi Co-Location (QCL) characteristics to be used by the user device for receiving physical downlink control channels (PDCCHs) associated with the plurality of cells with different PCIs or associated with the plurality of cell groups, wherein the plurality of cells or the plurality of cell groups include at least a serving cell and at least one non-serving cell for the user device; and determining, by the user device, that at least one of the following conditions is present: 1) a multi-DCI based multi-TRP-related high layer parameter has been configured to the user device; 2) a default mode of multi-TRP operation has been configured to the user device; or 3) the user device has received control information indicating physical downlink shared channel (PDSCH) TCI state activations corresponding to two different CORESETPoolIndex values; and performing, by the user device, inter-cell multi-DCI based multi-TRP operation with the cells from the plurality of cells, or with cells from the plurality of cell groups, based on the determining to perform multi-DCI based inter-cell multi-TRP operation.

Example 18. The method of Example 17 wherein the user device performs inter-cell multi-DCI based multi-TRP operation with the cells from the plurality of cells, or with the cells from the plurality of cell groups, wherein the user device has not been explicitly configured, via setting of CORESETPoolIndex values for the user device to more than one value for CORESETs, for inter-cell multi-DCI based multi-TRP operation.

Example 19. The method of any of Examples 17-18, wherein the performing inter-cell multi-DCI based multi-TRP operation with the cells from the plurality of cells, or with the cells from the plurality of cell groups comprises the user device performing at least one of the following with respect to a first TRP that includes the serving cell, and a second TRP that includes the at least one non-serving cell: a separate channel monitoring, data processing, and/or a separate receiving and/or transmission of control and data, with respect to a set of channels (PUCCH/PUSCH/PDSCH/PDCCH) corresponding to each of the serving cell and the at least one non-serving cell; separately monitoring of downlink control information (DCI) on separate PDCCHs from each of the serving cell and the at least one non-serving cell; receiving of downlink data scheduled by DCIs and received via corresponding PDSCH channels, for each of the serving cell and the at least one non-serving cell; descrambling of PDSCH channel separately for PDSCH from the serving cell and the at least one non-serving cell; performing separate PUSCH scheduling of uplink data transmission, based on corresponding DCI, for each of the serving cell and the at least one non-serving cell; performing separate beam failure detection and/or beam failure recovery, with respect to the serving cell and with respect to the non-serving cell; or sending Hybrid ARQ (HARQ) feedback for the serving cell and the at least one non-serving cell.

Example 20. The method of any of Examples 17-19, wherein the performing, by the user device, inter-cell multi-DCI based multi-TRP operation with the cells from the plurality of cells, or with the cells from the plurality of cell groups is performed by the user device as if CORESETPoolIndex values were configured, even though the user device has not been explicitly configured for multi-TRP operation via setting of CORESETPoolIndex values to more than one value for CORESETs, based on at least one of the following: 1) a lowest PCI among two PCIs representing the CORESETPoolIndex=0, and a highest PCI among the two PCIs representing CORESETPoolIndex=1; 2) a highest PCI among two PCIs representing the CORESETPoolIndex=0, and a lowest PCI among the two PCIs representing CORESETPoolIndex=1; 3) a serving cell PCI among two PCIs representing the CORESETPoolIndex=0, and the non-serving cell PCI among the two PCIs representing CORESETPoolIndex=1; or 4) a predefined PCI among two PCIs representing the CORESETPoolIndex=0, and a remaining PCI among the two PCIs representing CORESETPoolIndex=1.

Example 21 The method of any of Examples 17-20, wherein the performing, by the user device, inter-cell multi-DCI based multi-TRP operation with the cells from the plurality of cells, or with the cells from the plurality of cell groups, is performed by the user device based on more than two CORESETPoolIndex values that correspond to different PCIs or different cell groups.

Example 22. The method of any of Examples 17-21, wherein a first cell group represents CORESETPoolIndex=0, and a second cell group represents CORESETPoolIndex=1.

Example 23. The method of any of Examples 17-22, wherein the first and second cell groups each include a plurality of non-serving cells.

Example 24. The method of any of Examples 17-23, wherein 3) the user device has received control information indicating physical downlink shared channel (PDSCH) TCI state activations corresponding to two different CORESETPoolIndex values comprises: the user device has received a medium access control-control element (MAC-CE) indicating PDSCH TCI state activations for two different CORESETPoolIndex values, and wherein each TCI state activation is associated with a PCI; the method further comprising determining, by the user device, a cell group that includes the PCIs associated with TCI state activations received via the MAC-CE for the CORESETPoolIndex value.

Example 25. The method of any of Examples 17-24, further comprising: receiving, by the user device from the network node, a message or signaling that indicates PCIs assigned to a cell group.

Example 26. The method of any of Examples 17-25, further comprising: receiving, by the user device from the network node, a measurement configuration that also indicates PCIs assigned to a cell group.

Example 27. The method of any of Examples 17-26, further comprising: receiving, by the user device from the network node, updated TCI states for a plurality of CORESETs, wherein the TCI states for the plurality of CORESETs are associated only with one PCI or one cell group; changing operation of the user device from the inter-cell multi-DCI based multi-TRP operation to a single TRP operation, based on the receiving the updated TCI states.

Example 28. The method of any of Examples 17-27, wherein, in response to the user device receiving TCI state activations for CORESETs where different TCI states for respective CORESETs are associated with at least two different physical cell identities (PCIs), indicating inter-cell multi-DCI based multi-TRP operation, the user device performs or operates as if it has been configured with a CORESETPoolIndex value in ControlResourceSet (CORESET), and the user device determines that the CORESET associated with the serving cell PCI as a CORESET having a CORESETPoolIndex=0.

Example 29. The method of any of Examples 17-28, wherein, in response to the user device receiving TCI state activations for CORESETs where different TCI states for respective CORESETs are associated with at least two different physical cell identities (PCIs), performing, by the user device, beam failure detection using respective sets of BFD-RS (beam failure detection reference signals) wherein the reference signal (RS) for respective sets of BFD-RS are determined based on the associated PCI values for the CORESETs of the serving-cell and the at least one non-serving cell.

Example 30. The method of any of Examples 17-29, wherein 1) a multi-DCI based multi-TRP-related high layer parameter has been configured to the user device comprises one or more of the following: more than three CORESETs are configured to the user device for a downlink bandwidth part (DL BWP); more than one scrambling sequence is configured to the user device; more than one rate matching pattern for LTE-CRS (LTE cell specific reference signal) is configured to the user device; either joint or separate HARQ feedback reporting is configured to the user device; and/or a multi-TRP-related high-layer parameter is configured to the user device.

Example 31. The method of any of Examples 17-30, wherein 2) a default mode of multi-TRP operation has been configured to the user device comprises one or more of the following behaviors at the user device: the user device expects non-overlapping PDSCH reception; the user device expects overlapping and partially overlapping PDSCH reception with scrambling sequences defined based on the PCI applicable for associating CORESETPoolIndex value; the user device operates with separate HARQ feedback operation; the user device operates assuming pre-defined assumption for blind decode limit calculations; the user device assumes rate matching over union of CRS (cell specific reference signal) resources configured for both serving cell and non-serving cells; the user device expects in-order transmissions for PDCCH-PDSCH and PDCCH-PUSCH; and/or the user device follows any other pre-defined user device behavior when the condition of the plurality of CORESETs are associated with a plurality of cells having different physical cell identities (PCIs) or associated with different cell groups is satisfied.

Example 32. An apparatus comprising: means for determining, by a user device within a wireless network, to perform inter-cell multi-downlink control information (multi-DCI) based multi-transmission reception point (multi-TRP) operation for the user device based on the following: receiving, by the user device from a network node, transmission configuration index (TCI) states for a plurality of control resource sets (CORESETs), wherein the TCI states for the plurality of CORESETs are associated with a plurality of cells having different physical cell identities (PCIs) or associated with a plurality of cell groups, wherein the TCI states indicate Quasi Co-Location (QCL) characteristics to be used by the user device for receiving physical downlink control channels (PDCCHs) associated with the plurality of cells with different PCIs or associated with the plurality of cell groups, wherein the plurality of cells or the plurality of cell groups include at least a serving cell and at least one non-serving cell for the user device; means for determining, by the user device, that at least one of the following conditions is present: 1) a multi-DCI based multi-TRP-related high layer parameter has been configured to the user device; 2) a default mode of multi-TRP operation has been configured to the user device; or 3) the user device has received control information indicating physical downlink shared channel (PDSCH) TCI state activations corresponding to two different CORESETPoolIndex values; and means for performing, by the user device, inter-cell multi-DCI based multi-TRP operation with cells from the plurality of cells, or with cells from the plurality of cell groups, based on the determining to perform multi-DCI based inter-cell multi-TRP operation.

Example 33. The apparatus of Example 32 wherein the user device performs inter-cell multi-DCI based multi-TRP operation with the cells from the plurality of cells, or with the cells from the plurality of cell groups, wherein the user device has not been explicitly configured, via setting of CORESETPoolIndex values for the user device to more than one value for CORESETs, for inter-cell multi-DCI based multi-TRP operation.

Example 34. The apparatus of any of Examples 32-33, wherein the means for performing inter-cell multi-DCI based multi-TRP operation with the cells from the plurality of cells, or with the cells from the plurality of cell groups comprises means for performing, by the user device, at least one of the following with respect to a first TRP that includes the serving cell, and a second TRP that includes the at least one non-serving cell: a separate channel monitoring, data processing, and/or a separate receiving and/or transmission of control and data, with respect to a set of channels (PUCCH/PUSCH/PDSCH/PDCCH) corresponding to each of the serving cell and the at least one non-serving cell; separately monitoring of downlink control information (DCI) on separate PDCCHs from each of the serving cell and the at least one non-serving cell; receiving of downlink data scheduled by DCIs and received via corresponding PDSCH channels, for each of the serving cell and the at least one non-serving cell; descrambling of PDSCH channel separately for PDSCH from the serving cell and the at least one non-serving cell; performing separate PUSCH scheduling of uplink data transmission, based on corresponding DCI, for each of the serving cell and the at least one non-serving cell; performing separate beam failure detection and/or beam failure recovery, with respect to the serving cell and with respect to the non-serving cell; or sending Hybrid ARQ (HARQ) feedback for the serving cell and the at least one non-serving cell.

Example 35. The apparatus of any of Examples 32-34, wherein the means for performing, by the user device, inter-cell multi-DCI based multi-TRP operation with the cells from the plurality of cells, or with the cells from the plurality of cell groups is performed by the user device as if CORESETPoolIndex values were configured, even though the user device has not been explicitly configured for multi-TRP operation via setting of CORESETPoolIndex values to more than one value for CORESETs, based on at least one of the following: 1) a lowest PCI among two PCIs representing the CORESETPoolIndex=0, and a highest PCI among the two PCIs representing CORESETPoolIndex=1; 2) a highest PCI among two PCIs representing the CORESETPoolIndex=0, and a lowest PCI among the two PCIs representing CORESETPoolIndex=1; 3) a serving cell PCI among two PCIs representing the CORESETPoolIndex=0, and the non-serving cell PCI among the two PCIs representing CORESETPoolIndex=1; or 4) a predefined PCI among two PCIs representing the CORESETPoolIndex=0, and a remaining PCI among the two PCIs representing CORESETPoolIndex=1.

Example 36. The apparatus of any of Examples 32-35, wherein the means for performing, by the user device, inter-cell multi-DCI based multi-TRP operation with the cells from the plurality of cells, or with the cells from the plurality of cell groups, is performed by the user device based on more than two CORESETPoolIndex values that correspond to different PCIs or different cell groups.

Example 37. The apparatus of any of Examples 32-36, wherein a first cell group represents CORESETPoolIndex=0, and a second cell group represents CORESETPoolIndex=1.

Example 38. The apparatus of any of Examples 32-37, wherein the first and second cell groups each include a plurality of non-serving cells.

Example 39. The apparatus of any of Examples 32-38, wherein 3) the user device has received control information indicating physical downlink shared channel (PDSCH) TCI state activations corresponding to two different CORESETPoolIndex values comprises: the user device has received a medium access control-control element (MAC-CE) indicating PDSCH TCI state activations for two different CORESETPoolIndex values, and wherein each TCI state activation is associated with a PCI; the method further comprising determining, by the user device, a cell group that includes the PCIs associated with TCI state activations received via the MAC-CE for the CORESETPoolIndex value.

Example 40. The apparatus of any of Examples 32-39, further comprising: means for receiving, by the user device from the network node, a message or signaling that indicates PCIs assigned to a cell group.

Example 41. The apparatus of any of Examples 32-40, further comprising: means for receiving, by the user device from the network node, a measurement configuration that also indicates PCIs assigned to a cell group.

Example 42. The apparatus of any of Examples 32-41, further comprising: means for receiving, by the user device from the network node, updated TCI states for a plurality of CORESETs, wherein the TCI states for the plurality of CORESETs are associated only with one PCI or one cell group; changing operation of the user device from the inter-cell multi-DCI based multi-TRP operation to a single TRP operation, based on the receiving the updated TCI states.

Example 43. The apparatus of any of Examples 32-42, comprising means for, in response to the user device receiving TCI state activations for CORESETs where different TCI states for respective CORESETs are associated with at least two different physical cell identities (PCIs), indicating inter-cell multi-DCI based multi-TRP operation, performing by the user device, as if it has been configured with a CORESETPoolIndex value in ControlResourceSet (CORESET), and the user device determines that the CORESET associated with the serving cell PCI as a CORESET having a CORESETPoolIndex=0.

Example 44. The apparatus of any of Examples 32-43, comprising means for, in response to the user device receiving TCI state activations for CORESETs where different TCI states for respective CORESETs are associated with at least two different physical cell identities (PCIs), performing, by the user device, beam failure detection using respective sets of BFD-RS (beam failure detection reference signals) wherein the reference signal (RS) for respective sets of BFD-RS are determined based on the associated PCI values for the CORESETs of the serving-cell and the at least one non-serving cell.

Example 45. The apparatus of any of Examples 32-44, wherein 1) a multi-DCI based multi-TRP-related high layer parameter has been configured to the user device comprises one or more of the following: more than three CORESETs are configured to the user device for a downlink bandwidth part (DL BWP); more than one scrambling sequence is configured to the user device; more than one rate matching pattern for LTE-CRS (LTE cell specific reference signal) is configured to the user device; either joint or separate HARQ feedback reporting is configured to the user device; and/or a multi-TRP-related high-layer parameter is configured to the user device.

Example 46. The apparatus of any of Examples 32-45, wherein 2) a default mode of multi-TRP operation has been configured to the user device comprises one or more of the following behaviors at the user device: the user device expects non-overlapping PDSCH reception; the user device expects overlapping and partially overlapping PDSCH reception with scrambling sequences defined based on the PCI applicable for associating CORESETPoolIndex value; the user device operates with separate HARQ feedback operation; the user device operates assuming pre-defined assumption for blind decode limit calculations; the user device assumes rate matching over union of CRS (cell specific reference signal) resources configured for both serving cell and non-serving cells; the user device expects in-order transmissions for PDCCH-PDSCH and PDCCH-PUSCH; and/or the user device follows any other pre-defined user device behavior when the condition of the plurality of CORESETs are associated with a plurality of cells having different physical cell identities (PCIs) or associated with different cell groups is satisfied.

Figure 6:
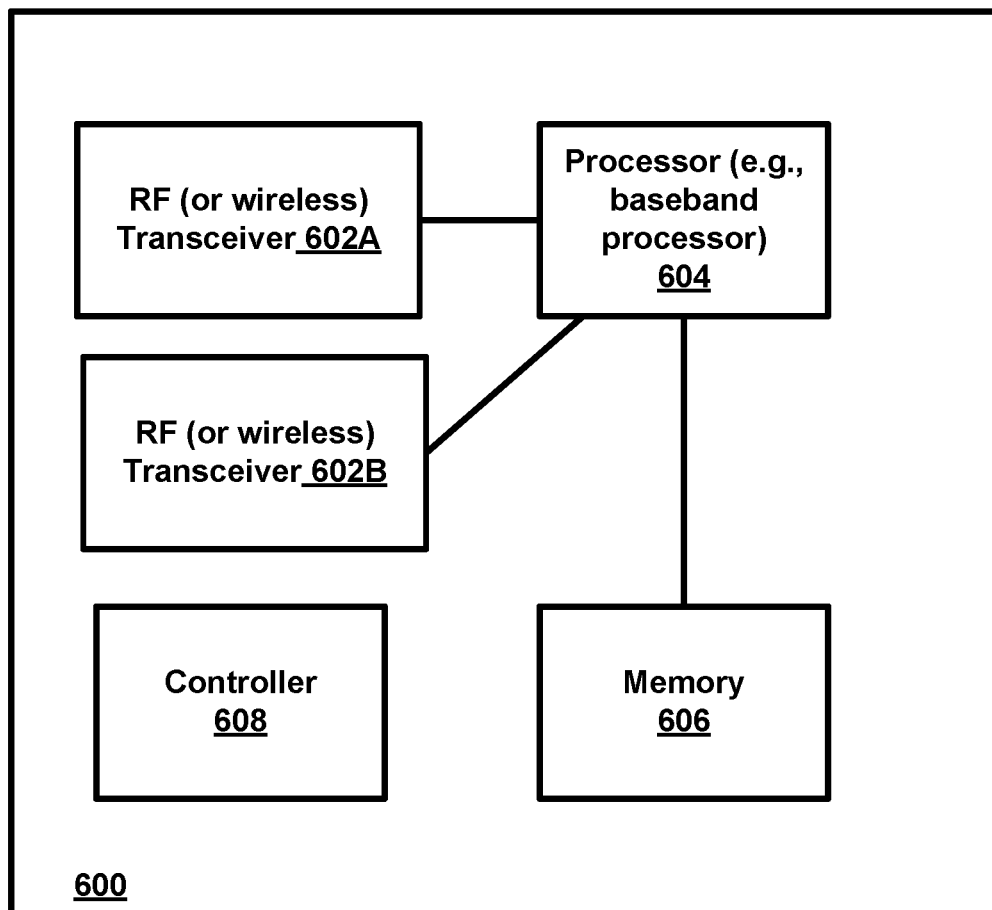
FIG. 6 is a block diagram of a wireless station (e.g., AP, BS, gNB, TRP, network node, user device, UE, or other wireless node) according to an example embodiment.

FIG. 6 is a block diagram of a network node (e.g., AP, BS, eNB, gNB, RAN node) 600 according to an example embodiment. The wireless station 600 may include, for example, one or more (e.g., two as shown in FIG. 6) RF (radio frequency) or wireless transceivers 602A, 602B, where each wireless transceiver includes a transmitter to transmit signals and a receiver to receive signals. The wireless station also includes a processor or control unit/entity (controller) 604 to execute instructions or software and control transmission and receptions of signals, and a memory 606 to store data and/or instructions.

Processor 604 may also make decisions or determinations, generate frames, packets or messages for transmission, decode received frames or messages for further processing, and other tasks or functions described herein. Processor 604, which may be a baseband processor, for example, may generate messages, packets, frames or other signals for transmission via wireless transceiver 602 (602A or 602B). Processor 604 may control transmission of signals or messages over a wireless network, and may control the reception of signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the station 600, and may provide control for other systems not shown in FIG. 6, such as controlling input/output devices (e.g., display, keypad), and/or may execute software for one or more applications that may be provided on wireless station 600, such as, for example, an email program, audio/video applications, a word processor, a Voice over IP application, or other application or software.

In addition, a storage medium may be provided that includes stored instructions, which when executed by a controller or processor may result in the processor 604, or other controller or processor, performing one or more of the functions or tasks described above.

According to another example embodiment, RF or wireless transceiver(s) 602A/602B may receive signals or data and/or transmit or send signals or data. Processor 604 (and possibly transceivers 602A/602B) may control the RF or wireless transceiver 602A or 602B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
   at least one processor; and
   at least one memory including computer program code;
   the at least one memory and the computer program code configured to, with the at least one processor, cause the apparatus at least to:
      determine, by a user device within a wireless network, to perform inter-cell multi-downlink control information (multi-DCI) based multi-transmission reception point (multi-TRP) operation for the user device based on the following:
      receive, by the user device from a network node, transmission configuration index (TCI) states for a plurality of control resource sets (CORESETs), wherein the TCI states for the plurality of CORESETs are associated with a plurality of cells having different physical cell identities (PCIs) or associated with a plurality of cell groups, wherein the TCI states indicate Quasi Co-Location (QCL) characteristics to be used by the user device for receiving physical downlink control channels (PDCCHs) associated with the plurality of cells with different PCIs or associated with the plurality of cell groups, wherein the plurality of cells or the plurality of cell groups include at least a serving cell and at least one non-serving cell for the user device; and
      determine, by the user device, that the following conditions is present:
         the user device has received a medium access control-control element (MAC-CE) indicating PDSCH TCI state activations for two different CORESETPoolIndex values, and wherein each TCI state activation is associated with a PCI; and
      perform, by the user device, inter-cell multi-DCI based multi-TRP operation with cells from the plurality of cells, or with cells from the plurality of cell groups, based on the determining to perform multi-DCI based inter-cell multi-TRP operation.

2. The apparatus of claim 1 wherein the computer program code is configured to, with the at least one processor, cause the apparatus to perform, by the user device, inter-cell multi-DCI based multi-TRP operation with the cells from the plurality of cells, or with the cells from the plurality of cell groups, wherein the user device has not been explicitly configured, via setting of CORESETPoolIndex values for the user device to more than one value for CORESETs, for inter-cell multi-DCI based multi-TRP operation.

3. The apparatus of claim 1, wherein the computer program code configured to, with the at least one processor, cause the apparatus to perform, by the user device, inter-cell multi-DCI based multi-TRP operation with the cells from the plurality of cells, or with the cells from the plurality of cell groups comprises the computer program code configured to, with the at least one processor, cause the apparatus to perform at least one of the following with respect to a first TRP that includes the serving cell, and a second TRP that includes the at least one non-serving cell:
   a separate channel monitoring, data processing, and/or a separate receiving and/or transmission of control and data, with respect to a set of channels (PUCCH/PUSCH/PDSCH/PDCCH) corresponding to each of the serving cell and the at least one non-serving cell;
   separately monitoring of downlink control information (DCI) on separate PDCCHs from each of the serving cell and the at least one non-serving cell;
   receiving of downlink data scheduled by DCIs and received via corresponding PDSCH channels, for each of the serving cell and the at least one non-serving cell;
   descrambling of PDSCH channel separately for PDSCH from the serving cell and the at least one non-serving cell;
   performing separate PUSCH scheduling of uplink data transmission, based on corresponding DCI, for each of the serving cell and the at least one non-serving cell;
   performing separate beam failure detection and/or beam failure recovery, with respect to the serving cell and with respect to the non-serving cell; or
   sending Hybrid ARQ (HARQ) feedback for the serving cell and the non-serving cell.

4. The apparatus of claim 1 wherein the computer program code configured to, with the at least one processor, cause the apparatus to perform, by the user device, inter-cell multi-DCI based multi-TRP operation with the cells from the plurality of cells, or with the cells from the plurality of cell groups is performed by the user device as if CORESETPoolIndex values were configured, even though the user device has not been explicitly configured for multi-TRP operation via setting of CORESETPoolIndex values to more than one value for CORESETs, based on at least one of the following:
   1) a lowest PCI among two PCIs representing the CORESETPoolIndex=0, and the highest PCI among the two PCIs representing CORESETPoolIndex=1;
   2) a highest PCI among two PCIs representing the CORESETPoolIndex=0, and the lowest PCI among the two PCIs representing CORESETPoolIndex=1;
   3) a serving cell PCI among two PCIs representing the CORESETPoolIndex=0, and the non-serving cell PCI among the two PCIs representing CORESETPoolIndex=1; or
   4) a predefined PCI among two PCIs representing the CORESETPoolIndex=0, and a remaining PCI among the two PCIs representing CORESETPoolIndex=1.

5. The apparatus of claim 1 wherein the computer program code configured to, with the at least one processor, cause the apparatus to perform, by the user device, inter-cell multi-DCI based multi-TRP operation with the cells from the plurality of cells, or with the cells from the plurality of cell groups, is performed by the user device based on more than two CORESETPoolIndex values that correspond to different PCIs or different cell groups.

6. The apparatus of claim 1, wherein a first cell group represents CORESETPoolIndex=0, and a second cell group represents CORESETPoolIndex=1.

7. The apparatus of claim 1, wherein the first and second cell groups each include a plurality of non-serving cells.

8. The apparatus of claim 1, wherein the computer program code configured to, with the at least one processor, cause the apparatus to:
   determine, by the user device, a cell group that includes the PCIs associated with TCI state activations received via the MAC-CE for the CORESETPoolIndex value.

9. The apparatus of claim 1, further comprising:
   the computer program code configured to, with the at least one processor, cause the apparatus to receive, by the user device from the network node, a message or signaling that indicates PCIs assigned to a cell group.

10. The apparatus of claim 1, further comprising:
the computer program code is configured to, with the at least one processor, cause the apparatus to receive, by the user device from the network node, a measurement configuration that also indicates PCIs assigned to a cell group.

11. The apparatus of claim 1, wherein the computer program code is configured to, with the at least one processor, cause the apparatus to further perform, by the user device:
receive, by the user device from the network node, updated TCI states for the plurality of CORESETs, wherein the TCI states for the plurality of CORESETs are associated only with one PCI or one cell group; and
change operation of the user device from the inter-cell multi-DCI based multi-TRP operation to a single TRP operation, based on the receiving the updated TCI states.

12. The apparatus of claim 1, wherein, in response to the user device receiving TCI state activations for CORESETs wherein different TCI states for respective CORESETs are associated with at least two different physical cell identities (PCIs), indicating inter-cell multi-DCI based multi-TRP operation, the user device performs or operates as if it has been configured with a CORESETPoolIndex value in ControlResourceSet (CORESET), and the user device determines that the CORESET associated with the serving cell PCI as a CORESET having a CORESETPoolIndex=0.

13. The apparatus of claim 1, further comprising:
the computer program code is configured to, with the at least one processor, cause the apparatus to: in response to the user device receiving TCI state activations for CORESETs wherein different TCI states for respective CORESETs are associated with at least two different physical cell identities (PCIs), perform, by the user device, beam failure detection using respective sets of BFD-RS (beam failure detection reference signals) wherein the reference signal (RS) for respective sets of BFD-RS are determined based on the associated PCI values for the CORESETs of the serving-cell and the at least one non-serving cell.

14. The apparatus of claim 1, wherein the computer program code configured to, with the at least one processor, cause the apparatus to determine a multi-DCI based multi-TRP-related high layer parameter has been configured to the user device; and
wherein the multi-DCI based multi-TRP-related high layer parameter has been configured to the user device comprises one or more of the following:
more than three CORESETs are configured to the user device for a downlink bandwidth part (DL BWP);
more than one scrambling sequence is configured to the user device;
more than one rate matching pattern for LTE-CRS (LTE cell specific reference signal) is configured to the user device;
either joint or separate HARQ feedback reporting is configured to the user device; and/or
a multi-TRP-related high-layer parameter is configured to the user device.

15. The apparatus of claim 1, wherein the computer program code configured to, with the at least one processor, cause the apparatus to determine a default mode of multi-TRP operation has been configured to the user device; and wherein the default mode of multi-TRP operation has been configured to the user device-comprises one or more of the following behaviors at the user device:
the user device expects non-overlapping PDSCH reception;
the user device expects overlapping and partially overlapping PDSCH reception with scrambling sequences defined based on the PCI applicable for associating CORESETPoolIndex value;
the user device operates with separate HARQ feedback operation;
the user device operates assuming pre-defined assumption for blind decode limit calculations;
the user device assumes rate matching over union of CRS resources configured for both serving cell and non-serving cells;
the user device expects in-order transmissions for PDCCH-PDSCH and PDCCH-PUSCH; and/or
the user device follows any other pre-defined user device behavior when the condition of the plurality of CORESETs are associated with the plurality of cells having different physical cell identities (PCIs) or associated with the plurality of cell groups is satisfied.

16. A non-transitory computer-readable storage medium comprising instructions stored thereon that, when executed by at least one processor, are configured to cause a computing system to:
determine, by a user device within a wireless network, to perform inter-cell multi-downlink control information (multi-DCI) based multi-transmission reception point (multi-TRP) operation for the user device based on the following:
receive, by the user device from a network node, transmission configuration index (TCI) states for a plurality of control resource sets (CORESETs), wherein the TCI states for the plurality of CORESETs are associated with a plurality of cells having different physical cell identities (PCIs) or associated with a plurality of cell groups, wherein the TCI states indicate Quasi Co-Location (QCL) characteristics to be used by the user device for receiving physical downlink control channels (PDCCHs) associated with the plurality of cells with different PCIs or associated with the plurality of cell groups, wherein the plurality of cells or the plurality of cell groups include at least a serving cell and at least one non-serving cell for the user device; and
determine, by the user device, that at least the following conditions is present:
the user device has received a medium access control-control element (MAC-CE) indicating PDSCH TCI state activations for two different CORESETPoolIndex values, and wherein each TCI state activation is associated with a PCI; and
perform, by the user device, inter-cell multi-DCI based multi-TRP operation with cells from the plurality of cells, or with cells from the plurality of cell groups, based on the determining to perform multi-DCI based inter-cell multi-TRP operation.

17. A method comprising:
determining, by a user device within a wireless network, to perform inter-cell multi-downlink control information (multi-DCI) based multi-transmission reception point (multi-TRP) operation for the user device based on the following:
receiving, by the user device from a network node, transmission configuration index (TCI) states for a plurality of control resource sets (CORESETs), wherein the TCI states for the plurality of CORESETs are associated with a plurality of cells having different physical cell identities (PCIs) or associated with a plurality of cell groups, wherein the TCI states indicate Quasi Co-Location (QCL) characteristics to be used by the user device for receiving physical downlink control channels (PDCCHs) associated with the plurality of cells with different PCIs or associated with the plurality of cell groups, wherein the plurality of cells or the plurality of cell groups include at least a serving cell and at least one non-serving cell for the user device; and determining, by the user device, that at least one of the following conditions is present:

the user device has received a medium access control-control element (MAC-CE) indicating PDSCH TCI state activations for two different CORESETPoolIndex values, and wherein each TCI state activation is associated with a PCI; and performing, by the user device, inter-cell multi-DCI based multi-TRP operation with cells from the plurality of cells, or with cells from the plurality of cell groups, based on the determining to perform multi-DCI based inter-cell multi-TRP operation.

18. The method of claim 17 wherein the user device performs inter-cell multi-DCI based multi-TRP operation with the cells from the plurality of cells, or with the cells from the plurality of cell groups, wherein the user device has not been explicitly configured, via setting of CORESETPoolIndex values for the user device to more than one value for CORESETs, for inter-cell multi-DCI based multi-TRP operation.

19. The method of claim 17, wherein the performing inter-cell multi-DCI based multi-TRP operation with the cells from the plurality of cells, or with the cells from the plurality of cell groups comprises the user device performing at least one of the following with respect to a first TRP that includes the serving cell, and a second TRP that includes the at least one non-serving cell:

a separate channel monitoring, data processing, and/or a separate receiving and/or transmission of control and data, with respect to a set of channels (PUCCH/PUSCH/PDSCH/PDCCH) corresponding to each of the serving cell and the at least one non-serving cell;

separately monitoring of downlink control information (DCI) on separate PDCCHs from each of the serving cell and the at least one non-serving cell;

receiving of downlink data scheduled by DCIs and received via corresponding PDSCH channels, for each of the serving cell and the at least one non-serving cell;

descrambling of PDSCH channel separately for PDSCH from the serving cell and the at least one non-serving cell;

performing separate PUSCH scheduling of uplink data transmission, based on corresponding DCI, for each of the serving cell and the at least one non-serving cell;

performing separate beam failure detection and/or beam failure recovery, with respect to the serving cell and with respect to the non-serving cell; or sending Hybrid ARQ (HARQ) feedback for the serving cell and the at least one non-serving cell.

20. The method of claim 17 wherein the performing, by the user device, inter-cell multi-DCI based multi-TRP operation with the cells from the plurality of cells, or with the cells from the plurality of cell groups is performed by the user device as if CORESETPoolIndex values were configured, even though the user device has not been explicitly configured for multi-TRP operation via setting of CORESETPoolIndex values to more than one value for CORESETs, based on at least one of the following:

1) a lowest PCI among two PCIs representing the CORESETPoolIndex=0, and a highest PCI among the two PCIs representing CORESETPoolIndex=1;
2) a highest PCI among two PCIs representing the CORESETPoolIndex=0, and a lowest PCI among the two PCIs representing CORESETPoolIndex=1;
3) a serving cell PCI among two PCIs representing the CORESETPoolIndex=0, and the non-serving cell PCI among the two PCIs representing CORESETPoolIndex=1; or
4) a predefined PCI among two PCIs representing the CORESETPoolIndex=0, and a remaining PCI among the two PCIs representing CORESETPoolIndex=1.

\* \* \* \* \*